US012724122B2

(12) United States Patent
Pao et al.

(10) Patent No.: US 12,724,122 B2
(45) Date of Patent: Sep. 1, 2026

(54) HYDROPHILIC MATERIAL AND COATING FOR AUTOMOTIVE LIDAR SENSOR COVERS

(71) Applicant: Magna Exteriors Inc., Aurora (CA)

(72) Inventors: Wing Li Pao, Oshawa (CA); Long Li, Oshawa (CA); Martin Agelin-Chaab, Oshawa (CA); Julian Knutzen, Aurora (CA); Alexis Baltazar-Y-Jimenez, Troy, MI (US)

(73) Assignee: Magna Exteriors Inc., Aurora (CA)

( * ) Notice: Subject to any disclaimer, the term of this patent is extended or adjusted under 35 U.S.C. 154(b) by 492 days.

(21) Appl. No.: 18/343,302

(22) Filed: Jun. 28, 2023

(65) Prior Publication Data

US 2024/0027583 A1 Jan. 25, 2024

Related U.S. Application Data

(60) Provisional application No. 63/391,375, filed on Jul. 22, 2022.

(51) Int. Cl.
*G01S 7/481* (2006.01)
*C03C 17/34* (2006.01)
*C03C 17/42* (2006.01)

(52) U.S. Cl.
CPC ........ *G01S 7/4813* (2013.01); *C03C 17/3411* (2013.01); *C03C 17/42* (2013.01);
(Continued)

(58) Field of Classification Search
CPC ...... G01S 7/4813; C03L 7/3411; C03C 17/42; C03C 2217/732; C03C 2217/75; C03C 2217/78
(Continued)

(56) References Cited

U.S. PATENT DOCUMENTS 6,838,159 B2 * 1/2005 Eby .......................... C03C 17/36 359/359
10,569,747 B2 * 2/2020 Trebouet ................. B60S 1/528
(Continued)

FOREIGN PATENT DOCUMENTS

CN 108909639 A * 11/2018 ........... G01S 17/931
CN 211468304 U * 9/2020
(Continued)

OTHER PUBLICATIONS

Songwei Lu et al., UV-durable self-cleaning coatings for autoonmous driving, Sci Rep 14, 8066 (2024). https://doi.org/10.1038/s41598-024-58549-y (Year: 2024).*
(Continued)

*Primary Examiner* — Stephanie E Bloss
*Assistant Examiner* — Kevin C Butler

(57) ABSTRACT

A weather resistant autonomous driving sensor unit for an autonomous vehicle driving system. The sensor unit further includes a cover having an inside surface facing the one or more light detection and ranging sensors, and an external surface facing an external environment of a vehicle. The cover is formed of molded polycarbonate and also forms a vehicle component selected from the group consisting of a vehicle grille, bumper and front end module. A hydrophilic coating applied to the external surface of the coating. The hydrophilic coating can be made of several different compounds that are applied to the external surface using spraying, dipping or vapor deposition. The hydrophilic coating selected must provide a droplet thickness to diameter ratio of less than 0.3 when the water contact angle on the external surface of the cover is less than 40 degrees or between about 25 degrees to about 40 degrees.

17 Claims, 4 Drawing Sheets

(52) U.S. Cl.
CPC .... *C03C 2217/732* (2013.01); *C03C 2217/75* (2013.01); *C03C 2217/78* (2013.01)

(58) Field of Classification Search
USPC .............................................................. 73/431
See application file for complete search history.

(56) References Cited

U.S. PATENT DOCUMENTS

| | | | | |
|---|---|---|---|---|
| 11,867,927 | B1 * | 1/2024 | Jacoby | G02B 27/0172 |
| 11,965,991 | B1 * | 4/2024 | Stark | G01S 17/931 |
| 2013/0146577 | A1 * | 6/2013 | Haig | B60S 1/52 219/202 |
| 2018/0284232 | A1 * | 10/2018 | Peters | G01S 17/931 |
| 2018/0292515 | A1 * | 10/2018 | Paxton | B05D 3/06 |
| 2018/0299534 | A1 * | 10/2018 | LaChapelle | G06F 18/25 |
| 2020/0086346 | A1 * | 3/2020 | Kobrin | H10N 30/706 |
| 2020/0195831 | A1 * | 6/2020 | Muramatsu | H04N 23/90 |
| 2022/0018994 | A1 * | 1/2022 | Robertson, Jr. | B32B 7/05 |
| 2022/0266802 | A1 * | 8/2022 | Li | B60S 1/0848 |
| 2022/0281207 | A1 * | 9/2022 | Gross | B32B 7/12 |
| 2022/0373651 | A1 * | 11/2022 | Novotny | B32B 17/10119 |
| 2023/0020304 | A1 * | 1/2023 | Liu | G03B 17/12 |
| 2023/0384580 | A1 * | 11/2023 | Balili | B01L 3/502792 |
| 2024/0027583 | A1 * | 1/2024 | Pao | C03C 17/3411 |
| 2024/0352258 | A1 * | 10/2024 | Kayarkatte | C09D 5/004 |
| 2025/0055173 | A1 * | 2/2025 | Thangamani | B32B 17/1022 |

FOREIGN PATENT DOCUMENTS

| | | | | |
|---|---|---|---|---|
| CN | 211468305 | U * | 9/2020 | |
| CN | 211468308 | U * | 9/2020 | |
| CN | 111566511 | B * | 4/2024 | G05D 1/43 |
| CN | 119307170 | A * | 1/2025 | C09K 3/18 |
| DE | 102023127620 | A1 * | 4/2025 | A61C 9/0053 |
| JP | 2009203449 | A * | 9/2009 | |
| JP | 2009256556 | A * | 11/2009 | C09D 133/14 |
| JP | 2012166195 | A * | 9/2012 | |
| JP | 2023005857 | A * | 1/2023 | |
| JP | 2024504287 | A * | 1/2024 | F21S 43/2817 |
| WO | WO-2019136433 | A1 * | 7/2019 | B29C 48/10 |
| WO | WO-2020129456 | A1 * | 6/2020 | B32B 27/20 |
| WO | WO-2021002056 | A1 * | 1/2021 | H04N 23/55 |
| WO | WO-2021131122 | A1 * | 7/2021 | H04N 23/50 |
| WO | WO-2022150095 | A1 * | 7/2022 | F21S 43/2817 |

OTHER PUBLICATIONS

Ellinas, K., Durable superhydrophobic and superamphiphobic polymeric surfaces and their applications: A review, Advances in Colloid and Interface Science 250 (2017) 132-157, https://doi.org/10.1016/j.cis.2017.09.003, 2017 (Year: 2017).*

Gaylard et al., Surface contamination of cars: A review, Proc IMechE Part D:J Automobile Engineering 2017, vol. 231(9) 1160-1176 , IMechE 2017, nav DOI: 10.1177/0954407017695141 (Year: 2017).*

Lisco, F. et al., Degradation of hydrophobic, anti-soiling coatings for solar module cover glass, MDPI—Energies 2020, 13, 3811; doi: 10.3390/en13153811 (Year: 2020).*

Ratnaparkhi, A. et al., Is hydrophobic coating on glass equally efficient in reducing % soiling loss of solar PVs in clean and polluted environments?, Elsevier—Solar Energy 265 (2023) 112120, https://doi.org/10.1016/j.solener.2023.112120, 2023 (Year: 2023).*

Boda Li et al., Analysis of Automotive Camera Sensor Noise Factors and Impact on Object Detection, IEEE Sensors Journal, DOI 10.1109/JSEN.2022.3211406, 2022 (Year: 2022).*

Zhou, Y. et al., Rational design of self-cleaning superhydrophobic coating with outstanding abrasion resistance and weatherability: Towards highly efficient oil-water separation and anti-corrosion application, Elsevier—Progress in Organic Coatings 179 (2023) 107439 (Year: 2023).*

Song, Y.; Wang, Q.; Ying, Y.; You, Z.; Wang, S.; Chun, J.; Ma, X.; Wen, R. Droplet Spreading Characteristics on Ultra-Slippery Solid Hydrophilic Surfaces with Ultra-Low Contact Angle Hysteresis. Coatings 2022, 12, 755. https://doi.org/10.3390/coatings12060755 (Year: 2022).*

* cited by examiner

FIG. 1A
10a
T
12a
D
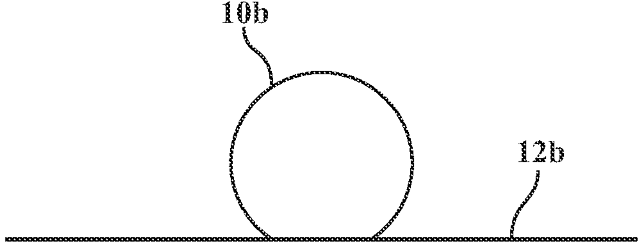
FIG. 1B
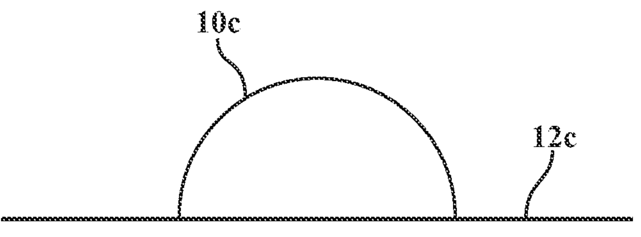
FIG. 1C
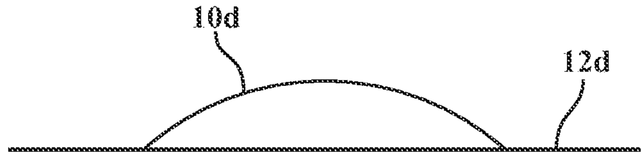
FIG. 1D
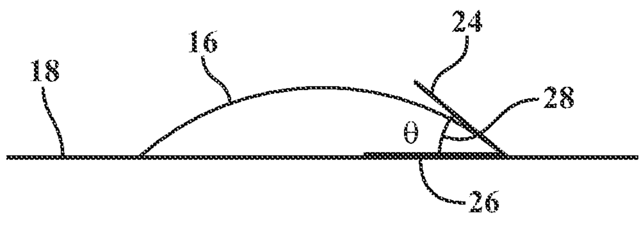
FIG. 1E

HYDROPHILIC MATERIAL AND COATING FOR AUTOMOTIVE LIDAR SENSOR COVERS

FIELD OF THE INVENTION

The present invention relates to a hydrophilic material and coating for automotive LiDAR sensor covers.

BACKGROUND OF THE INVENTION

Vehicles with advanced driver-assist, semi-autonomous or fully autonomous systems heavily rely on the input of various sensors (Optical, Ultrasonic, Radar, LiDAR, IR, etc.) to capture environmental and traffic data. Clear sensor vision under all vehicle operating conditions has to be ensured to guarantee safe and uninterrupted operation. Different sensor types require different boundary conditions regarding applicability and performance (e.g., camera and LiDAR need unobstructed optical view, while a radio frequency radar might be covered by certain materials, which may affect its performance and range). Taking measures to optimize boundary conditions is absolutely critical to ensure robust and reliable sensor performance for safety. Soiling during adverse weather conditions is hazardous for autonomous driving because droplets and particles can cause obstructions and degradation of sensor signals. It also reduces the ability of an autonomous vehicle to navigate safely. It is desirable to develop coatings that will improve the LiDAR sensor performance in adverse weather conditions by creating a homogenous film of water on the LiDAR cover.

SUMMARY OF THE INVENTION

A weather resistant autonomous driving sensor unit having one or more light detection and ranging sensors connected to an autonomous vehicle driving system. The sensor unit further includes a cover having an inside surface facing the one or more light detection and ranging sensors, and an external surface facing an external environment of a vehicle. The cover is formed of molded polycarbonate and also forms a vehicle component selected from the group consisting of a vehicle grille, bumper and front end module. A hydrophilic coating applied to the external surface of the coating. The hydrophilic coating can be made of several different compounds that are applied to the external surface using spraying, dipping or vapor deposition. The hydrophilic coating selected must provide a droplet thickness to diameter ratio of less than 0.3 when the water contact angle on the external surface of the cover is less than 40 degrees or between about 25 degrees to about 40 degrees.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1*a* is a schematic view of droplet thickness to contact diameter ratio.

FIG. 1*b* is a schematic view of a droplet having a T/D ratio of ~1.25.

FIG. 1*c* is a schematic view of a droplet having a T/D ratio of about 0.5.

FIG. 1*d* is a schematic view of a droplet having a T/D ratio ~0.25.

FIG. 1*e* is a schematic view of a water contact angle measurement on a droplet having a T/D ratio of less than 0.25.

DETAILED DESCRIPTION OF THE PREFERRED EMBODIMENTS

The following description of the preferred embodiments is merely exemplary in nature and is in no way intended to limit the invention, its application, or uses.

Referring now to the figures, this invention focuses on the findings made on passive soiling mitigation through coatings of different material properties. The effectiveness of the coating is quantified by the wettability and the respective LiDAR sensor visibility % in adverse weather conditions such as driving-in-rain.

Method

Figure 2:
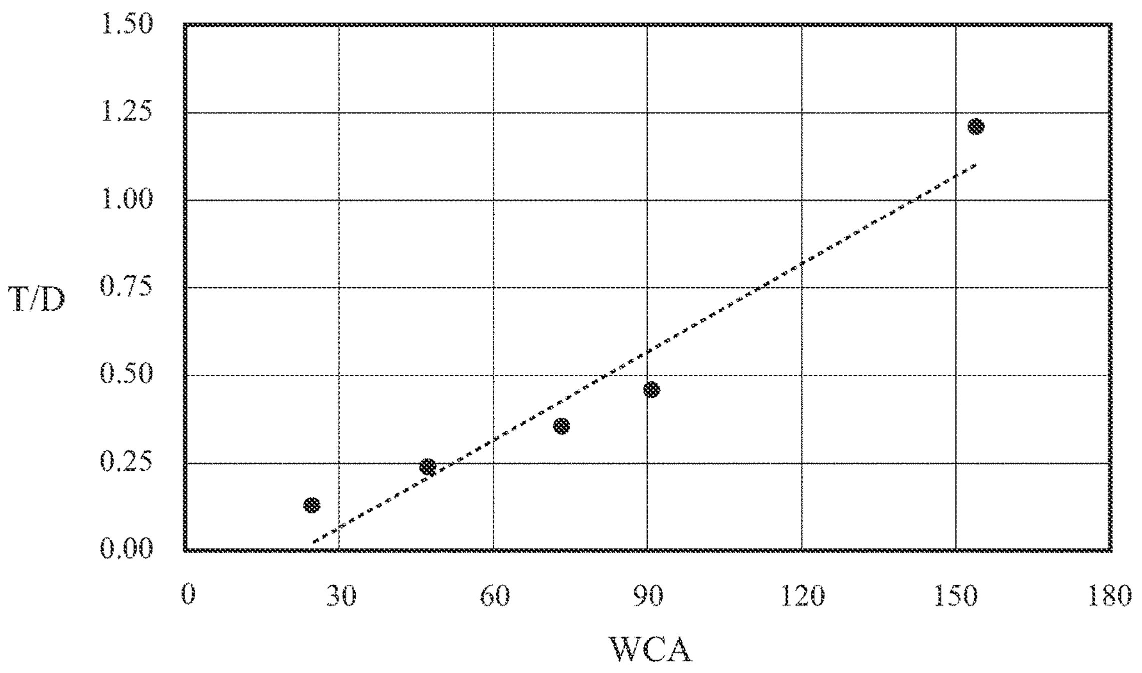
FIG. 2 is a graph showing the relationship between droplet T/D ratio and water contact angle on a cover surface.

Coating properties are first identified and are classified according to their static water contact angle, which is linearly correlated to the droplet thickness to contact diameter ratio (T/D). FIG. 2 contains a graph demonstrating the linear relationship between T/D and WCA. FIG. 1*a* is a schematic diagram showing a droplet 10*a* on a surface 12 and how the thickness T is measured relative to the diameter D of the droplet 10*a*. This is how the T/D ratio is determined for other droplet types described herein. FIG. 1*b* is a schematic view of a droplet 10*b* located on a surface 12*b* that is more hydrophilic. The droplet 10*b* has a T/D ratio of ~1.25. FIG. 1*c* is a schematic view of a droplet 10*c* on a surface 12*c* that is a less hydrophilic (i.e., more hydrophobic) than surface 12*b*. The droplet 10*c* has a T/D ratio of about 0.5. FIG. 1*d* is a schematic view of a droplet 10*d* on a surface 12*d* that is hydrophobic. The droplet 10*d* has a T/D ratio of ~0.25. FIG. 1*e* is a schematic view demonstrating how a water contact angle is measured on a droplet 16 on a surface 18, which is described in greater detail with respect to FIG. 3 below. The droplet 10*b* is thicker than droplet 10*c* and droplet 10*d*, while the droplet 10*d* is more spread out with a larger diameter and covers a larger surface area than droplet and droplet 10*c*.

Figure 3:
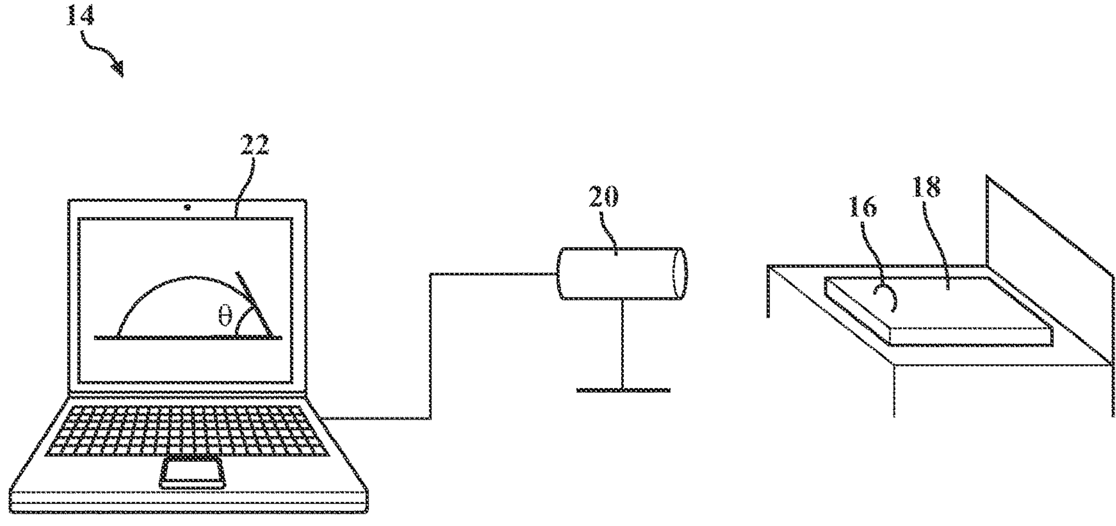
FIG. 3 is a schematic diagram showing how WCA is measured using the sessile drop technique.

A wide range of coatings of different water contact angles (WCA) in the range of ~25°-150° is evaluated under controlled conditions in various driving-in-rain scenarios in a wind tunnel. LiDAR visibility is extracted based on the percent of point-cloud present. WCA measurements are defined herein to be a measure of surface wettability, where its value is commonly used to classify the material type and determine predicted droplet behaviors (e.g., shape and motion) that are related to the surface energy of adhesion. Droplet thickness and the droplet contact diameter are two critical parameters that affect optical behaviors. Referring to FIGS. 1*a* and 3, WCA is measured using the sessile drop technique 14 where a known volume of the water droplet 16 dispensed onto the surface 18, which is a flat and leveled material surface. A 2-dimensional projected image is then immediately captured by an imaging device 20, such as camera and microscope and analyzed using a computer 22. A line 24 tangent to the droplet profile that intersect with a base contact line 26 is drawn, as shown schematically in FIG. 1*e*. The T/D is measured from the height and width of the droplet.

Figure 6:
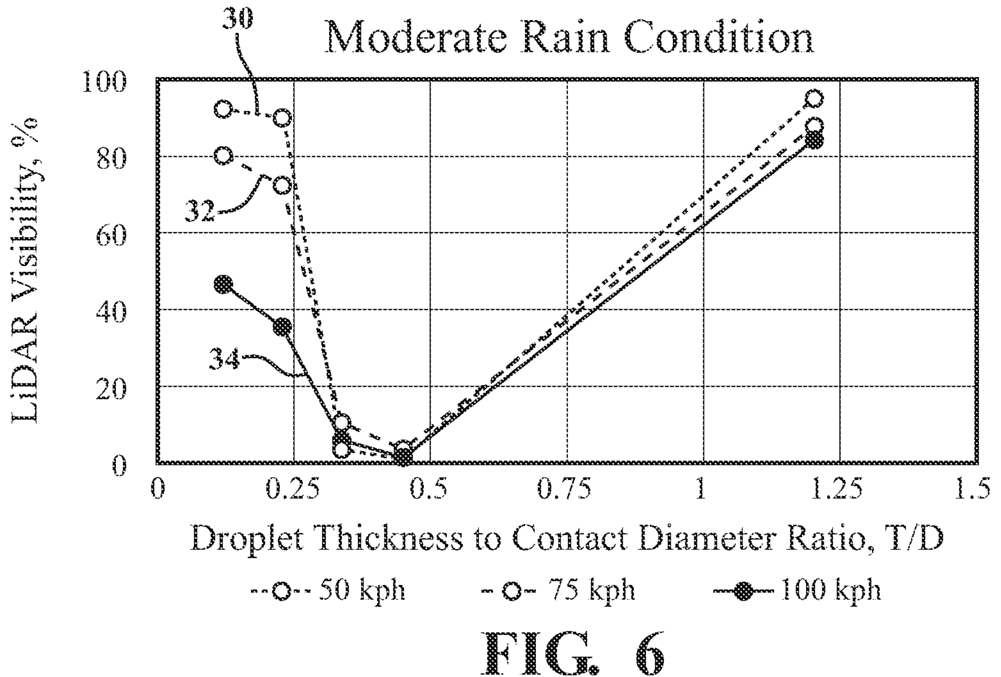
FIG. 6 is a graph showing the results of tests demonstrating LiDAR visibility for coatings with different T/D ratios when driving at 50, 75, and 100 km/hr. in moderate rain conditions.

A conventional low-cost approach to mitigate soiling on vehicle surfaces is to employ hydrophobic coatings; a lot of the products currently in the automotive market are hydrophobic in nature with WCA ~90-100°. However, our studies found that hydrophobic coatings are detrimental to LiDAR sensor signals due to the shape of the droplet adhering to the cover being hemispherical with T/D ~0.35-0.5 (FIG. 6). The mildly hydrophilic or hydrophobic coatings that lie in the median spectrum of the wettability class result in poor LiDAR visibility due to a large number of laser deflection events. Although enhanced hydrophobic or superhydrophobic coatings with WCA >140° (or T/D ~1.2) have demonstrated the capability of maintaining LiDAR visibility in high rain intensity conditions, there are several disadvantages to consider, such as poor durability, fabrication difficulty, and high maintenance cost. Also, it is risky to apply superhydrophobic coatings that may lose its superior hydrophobicity and impair LiDAR visibility completely without warning signs or a mild degradation curve for failure prediction.

On the other hand, hydrophilic coatings, which are typically not the general approach, are found to result in outstanding LiDAR visibility. When raindrops impact a hydrophilic surface, due to the higher surface adsorption energy than the molecular interactions within the droplet, a thin water film is formed.

Referring now to FIG. 6 are the results of an analysis of coating of various LiDAR visibility with different T/D ratios when driving at 50, 75 and 100 kilometers per hour (km/h) in moderate rain conditions. Line 30 are the results for speeds of 50 km/h and demonstrate that the film is stable at lower rain intensity conditions (i.e., 0.25 T/D) to maintain high LiDAR signal transmittance. When rain intensity increases as a result of driving speed increasing to 75 km/h as shown by line 32 or 100 km/h as shown by line 34, the density of droplet impact also increases, which creates a disruption to the water film and results in partial point-cloud obstruction. Under extreme rain intensity conditions, splashes occur in front of the surface, causing more vision loss as shown by line 34. Nonetheless, the LiDAR performance is predictable with respect to rain intensity. Based on the results of these studies, we propose the application of hydrophilic coatings for automotive LiDAR sensor cover in adverse weather conditions. In particular, the use of highly transparent and hydrophilic materials by nature such as glass for automotive LiDAR sensor applications is implemented. The benefit of glass includes its readiness in accepting different kinds of coatings (anti-reflective, anti-abrasion, etc.), chemical resistant, and durable, which have been proven by existing automotive applications such as windshields and headlights.

FIG. 1*a* is a schematic depiction of the droplet 10*a* and how it is measured for determining thickness and diameter on the surface 12*a*, which can be any suitable surface for a particular application. The surface 12*a* can be hydrophobic, hydrophilic or a combination thereof. Glass and coated polycarbonate are two hydrophilic materials that offer similar soiling mitigation capabilities. The results from using a glass cover also fall within the trend of LiDAR visibility with respect to T/D measurements. The droplet is a single rain droplet on the surface 12*a*. The droplet 10*a* has a droplet thickness (T) to surface contact diameter (D) is measured, with only considering one single droplet on the surface. For hydrophilic surfaces, droplets are widespread with large diameter and small thickness for a given droplet volume. Therefore, T/D ratio should be less than 0.5, while lower ratios are achieved when the surface is more hydrophilic. Water film was observed for T/D less than 0.25 and rain situation where there are sufficient number of droplets to spread into each other. (FIG. 1*d*). When a water film is established, LiDAR visibility is not severely affected compared to mildly hydrophobic surfaces in most rain driving conditions.

For mildly hydrophobic surfaces, the water contact angle is approximately 90 degrees, forming a semi-spherical shape, thus resulting in T/D of approximately 0.5. (FIG. 1*c*). As hydrophobicity increases, T/D also increases due to low adhesion on the surface, contact diameter decreases. (FIG. 1*b*). The rounder the droplet, the higher the T/D ratio. For example, a superhydrophobic surface would result in T/D of approximately 1.25.

Figure 4:
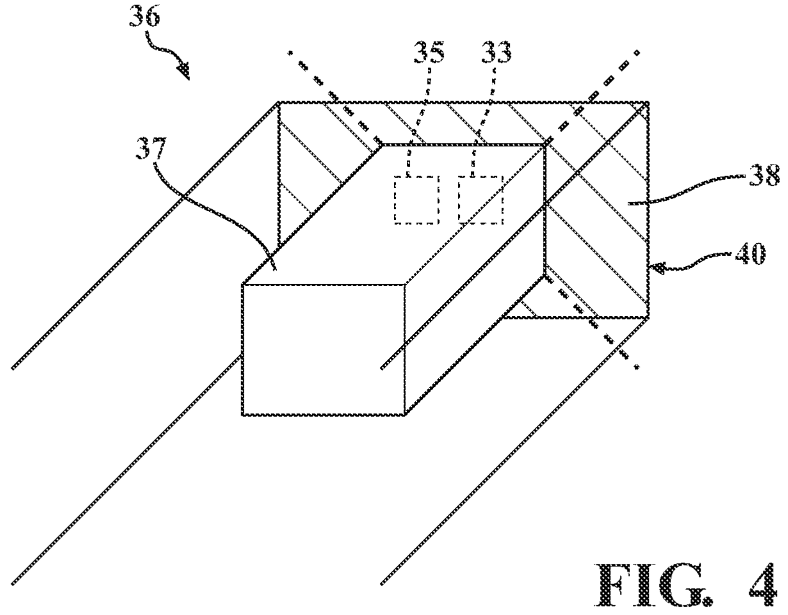
FIG. 4 is a schematic diagram showing a LiDAR housing and cover.
Figure 7:
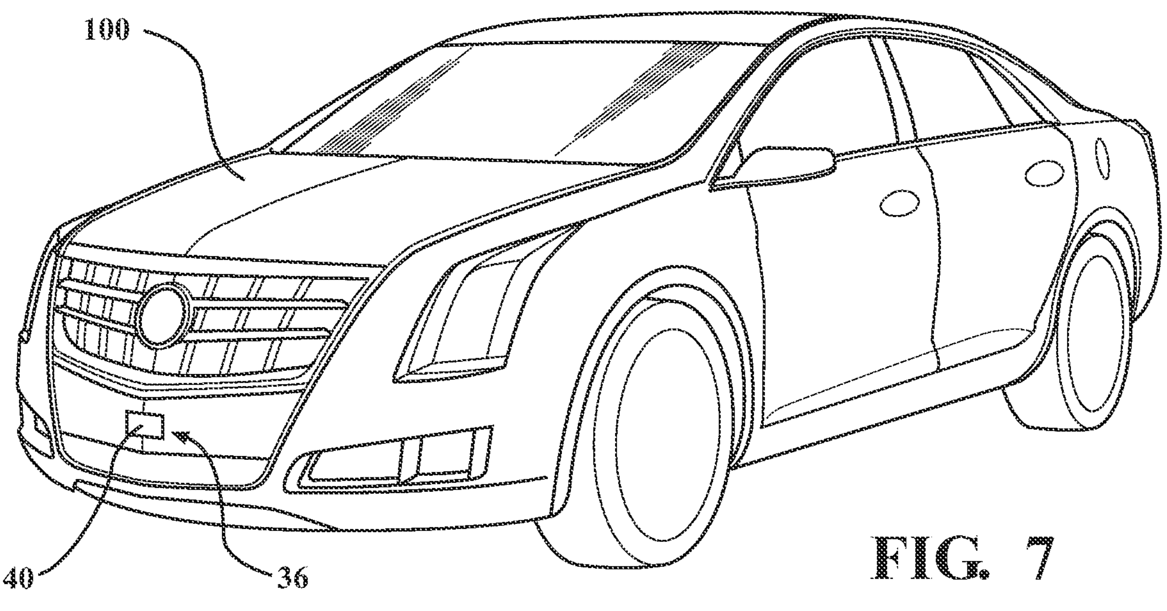
FIG. 7 is a perspective front view of a vehicle having a LiDAR housing and cover connected.

Referring now to FIGS. 4 and 7, there is a schematic diagram showing a LiDAR housing and cover arrangement 36. The LiDAR housing and cover arrangement 36 as shown in FIG. 7 is integrated into a vehicle 100 as part of the bumper fascia. As shown, there is a LiDAR unit 37 mounted on an internal surface 38. The LiDAR unit 37 includes laser emitting sources 33 and one or more sensors 35 for sensing reflected laser beams. The one or more sensors 35 are light detection and ranging sensors that are connected to an autonomous vehicle driving system. A cover 40 according to the present invention separates the LiDAR unit 37 from an external side of the cover 40. The cover has an inside surface that faces the one or more sensors of the LiDAR unit 37 and an external surface facing an external environment of a vehicle. While FIG. 7 shows the cover 40 to be part of the bumper fascia of the vehicle 100 it is within the scope of this invention for the cover arrangement 36 to be integrated into other components such as a vehicle grille or front end module, which helps to provide desired aesthetics of the cover arrangement 36. Also, it is within the scope of this invention for the cover arrangement 36 to be part of a separate LiDAR dome mounted to the vehicle and not necessarily be integrated into the different vehicle components. The LiDAR unit 37 is operably positioned relative to the cover 40 so that it can send and receive laser beam data through the cover 40.

Figure 5:
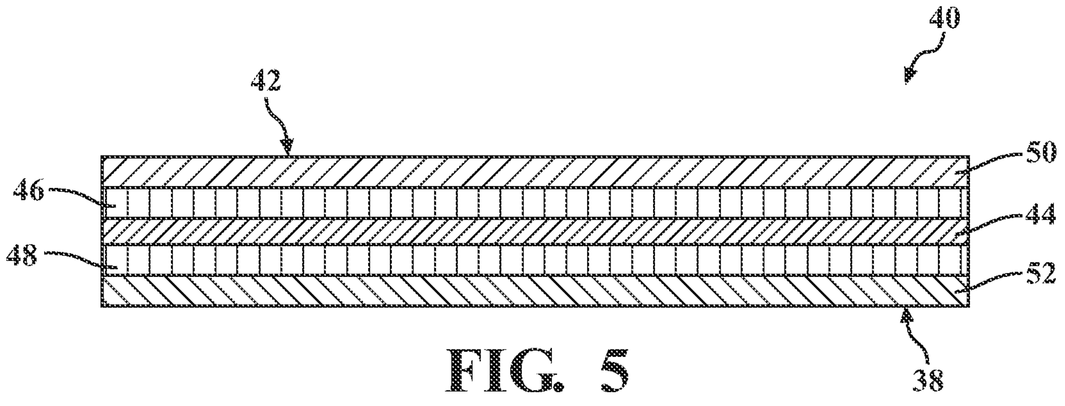
FIG. 5 is a schematic diagram showing a cross section of a portion of the cover and the various optional material layers.

FIG. 5 is a schematic diagram showing a cross section of a portion of the cover 40 and the various optional material layers. The cover 40 includes the inside surface 38 and external surface 42. Depending on the make-up of the cover there will be different measurable levels of LiDAR visibility. FIG. 5 shows a total of five layers, which can be used in various combinations. There is a core layer 44 that can be glass, polycarbonate or some other suitable transparent material. As shown there the cover has an external side and an internal side. Applied to the external side of the core layer 44 is an anti-abrasion coating layer 46 that protects the core layer from abrasion. An anti-abrasion coating layer 48 can also be applied to the inside of the core layer 44. The anti-abrasion coating layer 46 and anti-abrasion coating layer 48 are any suitable materials and can be sacrificial in nature, such that reapplication might be necessary. Examples of suitable materials for the anti-abrasion coating layer 46 and anti-abrasion coating layer 48 include, but are not limited to epoxy coatings, polyacrylic coating, ceramic coatings, polyurethane coatings, fluoropolymer coatings, etc. A hydrophilic coating layer 50 is applied over the anti-abrasion coating layer 46 and serves as the outermost layer external to the cover 40. The hydrophilic coating layer 50 is any suitable material and can include, but is not limited to, glass, ceramic, polycarbonate, etc. An anti-reflective coating 52 is applied over the anti-abrasion coating layer 48. The anti-reflective coating layer 52 is a suitable material, but includes silicon dioxide, titanium dioxide or a polarizing coating material, which can be a film or a layer of cured liquid. While layers there are five layer described above it is possible to have different applications where not all of them are used in a particular cover. It has been determined that in dry conditions the LiDAR visibility can vary depending on the layers combination. Set out in Table 1 below are various layers combinations with the determined LiDAR visibility for the different combinations. The layers combination column on Table 1 correspond to the layers shown FIG. 5. It is within the scope of this invention for a cover to have all of the layers mentioned above, or to have just the core layer 44, the core layer 44 plus the anti-abrasion coating layer 46 and anti-abrasion coating layer 48. It is further within the scope of the invention for a cover to be provided with the core layer 44 plus the anti-abrasion coating layer 46 and anti-abrasion coating layer 48 and the anti-reflective coating layer 52.

TABLE 1

| Layers Combination (Corresponds to reference numbers in FIG. 5) | LiDAR visibility in dry condition |
|---|---|
| None | 100% |
| 44 only | 97% |
| 46 + 44 + 48 | 101% |
| 46(already hydrophilic) + 44 + 48 + 52 | 102% |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A weather resistant autonomous driving sensor unit comprising:

one or more sensors connected to an autonomous vehicle driving system;

a cover having an inside surface facing the one or more sensors and an external surface facing an external environment of a vehicle; and a hydrophilic coating applied to the external surface of the cover, wherein the hydrophilic coating provides a droplet thickness to diameter ratio of less than 0.3 when the water contact angle on the external surface of the cover is less than 40 degrees or between about-25 degrees to about-40 degrees, wherein the cover includes a core layer, a first anti-abrasion coating between the core layer and the hydrophilic coating, a second anti-abrasion coating between on a side of the core layer opposite to the first anti-abrasion coating.

2. The weather resistant autonomous driving sensor unit of claim 1 wherein the core layer is formed of glass.

3. The weather resistant autonomous driving sensor unit of claim 1 wherein the first anti-abrasion layer and the second anti-abrasion layer are are formed of and epoxy coating, polyacrylic coating, ceramic coating, polyurethane coating, and fluoropolymer coating.

4. The weather resistant autonomous driving sensor unit of claim 1 further comprising an anti-reflective coating layer applied over the second anti-abrasion coating layer.

5. The weather resistant autonomous driving sensor unit of claim 4 wherein the anti-reflective coating layer is formed from silicon dioxide, titanium dioxide or a polarizing coating material.

6. The weather resistant driving sensor unit of claim 1 wherein the hydrophilic coating is formed of glass, ceramic and polycarbonate.

7. The weather resistant autonomous driving sensor unit of claim 1 wherein the core layer is formed of polycarbonate.

8. The weather resistant autonomous driving sensor unit of claim 7 wherein the first anti-abrasion layer and the second anti-abrasion layer each include one of epoxy coatings, polyacrylic coating, ceramic coatings, polyurethane coatings, and fluoropolymer coatings.

9. The weather resistant autonomous driving sensor unit of claim 7 further comprising an anti-reflective coating layer applied over the second anti-abrasion coating layer.

10. The weather resistant autonomous driving sensor unit of claim 9 wherein the anti-reflective coating layer is formed from silicon dioxide, titanium dioxide or a polarizing coating material.

11. A weather resistant autonomous driving sensor unit comprising:

one or more light detection and ranging sensors connected to an autonomous vehicle driving system;

a cover having an inside surface facing the one or more light detection and ranging sensors and an external surface facing an external environment of a vehicle, wherein the cover forms at least part of a vehicle grille, bumper or front end module;

a hydrophilic coating on the external surface of the cover, wherein the hydrophilic coating provides a droplet thickness to diameter ratio of less than 0.3 when the water contact angle on the external surface of the cover is less than 40 degrees or between about 25 degrees to about 40 degrees, wherein the cover includes a core layer, a first anti-abrasion coating between the cover and the hydrophilic coating, a second anti-abrasion coating between on a side of the core layer opposite to the first anti-abrasion coating, and an anti-reflective coating layer applied over the second anti-abrasion coating layer.

12. The weather resistant autonomous driving sensor unit of claim 11 wherein the core layer is formed of glass.

13. The weather resistant autonomous driving sensor unit of claim 12 wherein the first anti-abrasion layer and the second anti-abrasion layer each includes one of epoxy coatings, polyacrylic coating, ceramic coatings, polyurethane coatings, and fluoropolymer coatings.

14. The weather resistant autonomous driving sensor unit of claim 11 wherein the anti-reflective coating layer is formed from silicon dioxide, titanium dioxide or a polarizing coating material.

15. The weather resistant autonomous driving sensor unit of claim 11 wherein the core layer is formed of polycarbonate.

16. The weather resistant autonomous driving sensor unit of claim 15 wherein the first anti-abrasion layer and the second anti-abrasion layer are one of epoxy coatings, polyacrylic coating, ceramic coatings, polyurethane coatings, and fluoropolymer coatings.

17. The weather resistant driving sensor unit of claim 11 wherein the hydrophilic coating is of glass, ceramic and polycarbonate.

* * * * *